C. C. GRAY.
ENSILAGE HARVESTER.
APPLICATION FILED JUNE 6, 1914.
1,121,998.
Patented Dec. 22, 1914.
2 SHEETS—SHEET 1.
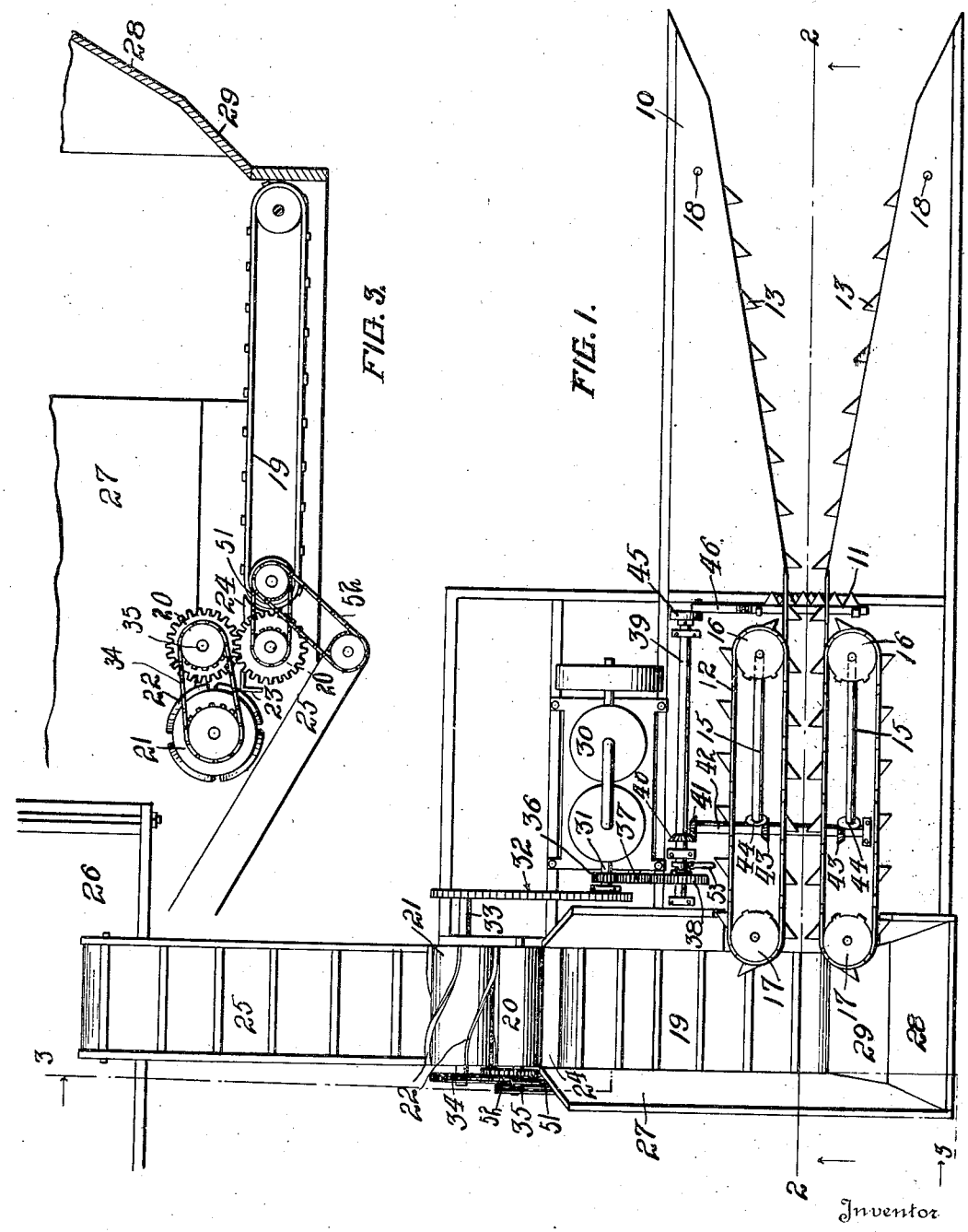

C. C. GRAY.
ENSILAGE HARVESTER.
APPLICATION FILED JUNE 6, 1914.
1,121,998.
Patented Dec. 22, 1914.
2 SHEETS—SHEET 2.
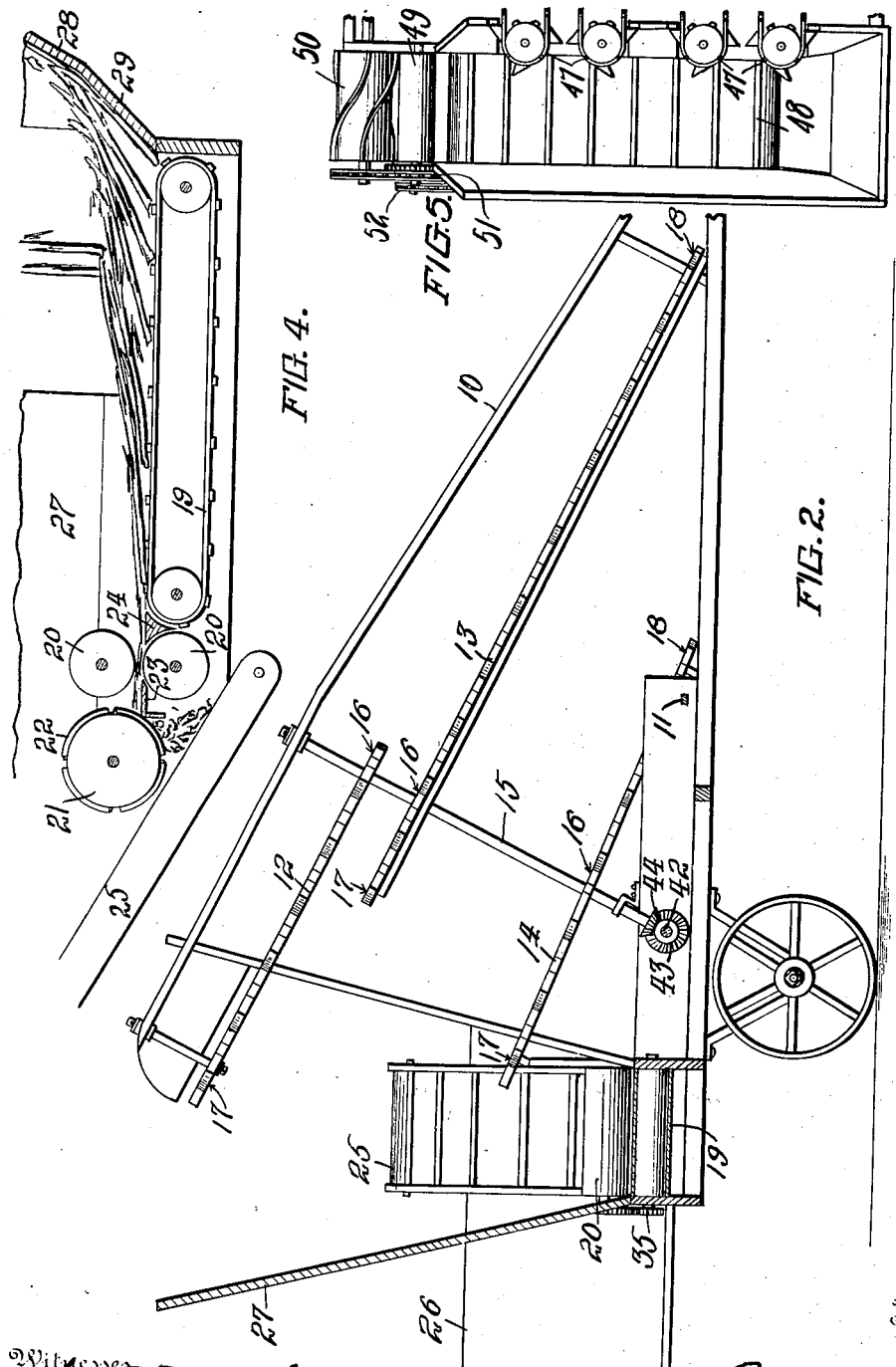

UNITED STATES PATENT OFFICE.

CARL C. GRAY, OF WAPAKONETA, OHIO.

ENSILAGE-HARVESTER.

1,121,998.  Specification of Letters Patent.  Patented Dec. 22, 1914.

Application filed June 6, 1914. Serial No. 843,342.

*To all whom it may concern:*

Be it known that I, CARL C. GRAY, a citizen of the United States, residing at Wapakoneta, in the county of Auglaize and State of Ohio, have invented certain new and useful Improvements in Ensilage-Harvesters, of which the following is a specification.

This invention relates to an ensilage harvester and particularly to a construction wherein the growing fodder material is first harvested and subsequently cut into ensilage in the same machine and by successive operations.

The invention has for an object to present a novel and improved structure whereby the stalk is carried rearwardly from the harvesting cutter in a substantially vertical position and then turned into a substantially horizontal position in order to introduce the butt end thereof to an ensilage cutter.

Other and further objects and advantages of the invention will be hereinafter set forth and the novel features thereof set forth in the appended claims.

In the drawings—Figure 1 is a plan of the harvester; Fig. 2 is a section on line 2—2 of Fig. 1; Fig. 3 is a section on line 3—3 of Fig. 1; Fig. 4 is a diagram showing the operation; and Fig. 5 is a diagram of a modified form.

Like numerals of reference refer to like parts in the several figures of the drawings.

The invention is applicable to any construction of harvester but for the purpose of illustration is shown in connection with an ordinary structure of corn harvester, in which the numeral 10 indicates the guides or shield boards supported in the usual manner. Transversely of these guides the harvesting cutter 11 is disposed to cut the stalks at the butts thereof. Coöperating with this cutter and extending rearwardly therefrom are the elevating conveyers 12, 13 and 14 which may comprise the ordinary lug chains. These chains are driven from a shaft 15 having a sprocket 16 for each chain. Idler sprockets 17 are provided at the upper ends of the chains and idlers 18 at the lower ends of chains 13 and 14.

The conveyer chains carry the stalks rearwardly in a substantially vertical position and deliver the same to a traveling conveyer 19 disposed at an angle thereto and in a plane below the chains so as to engage the butts of the stalks and carry them in the direction of travel of the conveyer. This throws the stalk into a substantially horizontal position upon the conveyer and introduces the butts thereof into the feed rolls 20 of the ensilage cutter 21. This cutter may be of any desired construction, for instance, a cylinder having the knives 22 as shown, which coöperate with the cutter plate 23. A feed table 24 is located between the conveyer 19 and the feed rolls. An inclined elevator 25 of any preferred structure extends beneath the ensilage cutter and delivers at its upper end to a wagon or other receptacle 26.

The conveyer 19 is preferably of endless construction and provided at its outer side with a guard wall 27 to retain the stalks in proper position. At the receiving end of the conveyer an inclined supporting wall 28 is provided with its lower portion 29 at a different angle. As the butts of the stalks are drawn by the conveyer toward the ensilage cutter the tops fall back upon this supporting wall and are thus guided into a horizontal position upon the conveyer, as shown in Fig. 4.

Any suitable driving means and connections may be used for operating the several parts. In this instance a motor 30 is shown having its shaft 31 geared at 32 to the shaft 33 of the ensilage cutter 21. This shaft is also provided with a geared connection at 34 with the shaft 35 of one of the feed rolls. The motor shaft 31 has also thereon a gear 36 meshing with the idler 37 which in turn meshes with a gear 38 on the countershaft 39. This carries a bevel gear 40 meshing with a similar gear 41 on the cross shaft 42 which carries bevel gears 43 meshing with coöperating gears 44 on the shafts 15 which are disposed at each side of the line of feed of the material. The shaft 39 is provided with a crank or pitman 45 connected with the operating rod 46 of the cutter bar 11.

In the operation of the invention the stalk to be harvested is first cut at its butt end and thence carried rearwardly in a substantially vertical position and discharged upon the angularly disposed conveyer which engages the butt of the stalk and turns it into a substantially horizontal position upon the conveyer with the butt end thereof traveling forward into the feed rolls of the ensilage cutter where it is reduced to the desired size and delivered by the elevator into a wagon for transportation directly to a silo or other storage place. This obviates the transportation of the bulky stalks and the use of a separate ensilage cutter and provides for a complete and continuous operation in a single machine.

The structure presented is simple and very efficient and economical in manufacture. It avoids the difficulties encountered in introducing the stalk into the ensilage cutter in a vertical position and provides a support for the entire length of the stalk as it is fed to the ensilage cutter which effects a straight feed and produces the most efficient results. It also permits the use of the machine for two or more rows of stalks by a proper extension of the conveyer belt, as shown by the modification in Fig. 5, where two sets of conveyer chains 47 are used and discharged at different points upon a traveling belt 48 which delivers to the feed rolls 49 and ensilage cutter 50. The parts are similar in construction and operation to those hereinbefore described and are driven by any suitable connections, for instance, the conveyer belt is shown in Fig. 3 as driven by a chain and sprocket gearing 51 from one of the feed rolls, while the discharging elevator 25 has a similar gearing 52 from the driven belt roll to a roll of the elevator. For the purpose of permitting the operation of the ensilage cutter independently of the harvester, a clutch 53 is provided on countershaft 39.

What I claim is:—

1. In a harvesting machine, a harvesting cutter, means for conveying stalks in a substantially vertical position rearwardly from said cutter, a secondary cutter, and moving means operating transversely to the path of travel of said conveying means for turning said stalks from a vertical into a substantially horizontal position and introducing the butt ends thereof to said secondary cutter.

2. In a harvesting machine, a harvesting cutter, means for conveying stalks in a substantially vertical position rearwardly from said cutter, a secondary cutter, and means extending parallel to said harvesting cutter and transversely to the path of travel of said conveying means across the delivery end thereof for turning said stalks from a vertical into a substantially horizontal position and introducing the butt ends thereof to said secondary cutter.

3. In a harvesting machine, a harvesting cutter, means for conveying stalks therefrom in a substantially vertical position, an ensilage cutter, and a traveling conveyer disposed transversely to the path of travel of and beneath said conveying means at the discharge end thereof to engage the butts of said stalks and introduce them to said ensilage cutter.

4. In a harvesting machine, a harvesting cutter, means for conveying stalks therefrom in a substantially vertical position, an ensilage cutter, a traveling conveyer disposed transversely to the path of travel of said conveying means at the discharge end thereof and delivering to said ensilage cutter, and an inclined supporting wall at the receiving end of said traveling conveyer.

5. In a harvesting machine, a harvesting cutter, means for conveying stalks therefrom in a substantially vertical position, an ensilage cutter, a traveling conveyer disposed transversely to the path of travel of said conveying means at the discharge end thereof and delivering to said ensilage cutter, an inclined supporting wall at the receiving end of said traveling conveyer, and an inclined guard wall at the outer side of said traveling conveyer.

6. In a harvesting machine, a harvesting cutter, means for conveying stalks therefrom in a substantially vertical position, an ensilage cutter, an endless belt located at the discharge end of said conveying means and transversely to the path of travel thereof to engage the butts of the stalks and dispose the latter upon said belt, and means for feeding the stalks butt first from said belt to said cutter.

7. In a harvesting machine, a harvesting cutter, means for conveying stalks therefrom in a substantially vertical position, an endless belt located at the discharge end of said conveying means and transversely to the path of travel thereof to engage the butts of the stalks and dispose the latter upon said belt parallel with its travel, an ensilage cutter, and feed rolls to feed from said belt to said cutter.

8. In a harvesting machine, a harvesting cutter, means for conveying stalks therefrom in a substantially vertical position, an endless belt located at the discharge end of said conveying means and transversely to the path of travel thereof to engage the butts of the stalks and dispose the latter upon said belt parallel with its travel, an ensilage cutter, feed rolls to feed from said belt to said ensilage cutter, an elevator extending beneath said ensilage cutter, a motor having a driving connection for said ensilage cutter, and a driving connection from said ensilage cutter to said feed rolls.

9. In a harvesting machine, a harvesting cutter, means for conveying stalks therefrom in a substantially vertical position, an endless belt located at the discharge end of said conveying means and transversely to the path of travel thereof to engage the butts of the stalks and dispose the latter upon said bent parallel with its travel, an ensilage cutter, feed rolls to feed from said belt to said ensilage cutter, an elevator extending beneath said ensilage cutter, a motor having a driving connection for said ensilage cutter, a driving connection from said ensilage cutter to said feed rolls, a countershaft geared to said motor, a driving connection from said countershaft to said conveying means, and a driving connection from said countershaft to said harvesting cutter.

In testimony whereof I affix my signature in presence of two witnesses.

CARL C. GRAY.

Witnesses:
J. A. STOUGHTON,
A. E. HAYES.